Sept. 16, 1941.  C. W. SINCLAIR  2,255,989
BRAKE
Filed Oct. 9, 1939
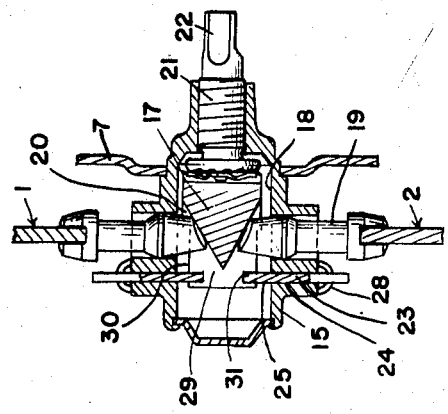
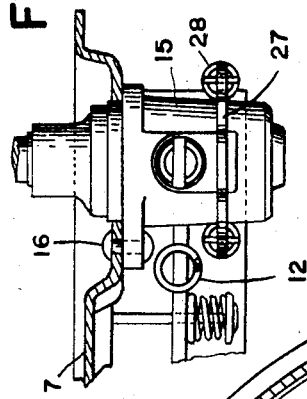
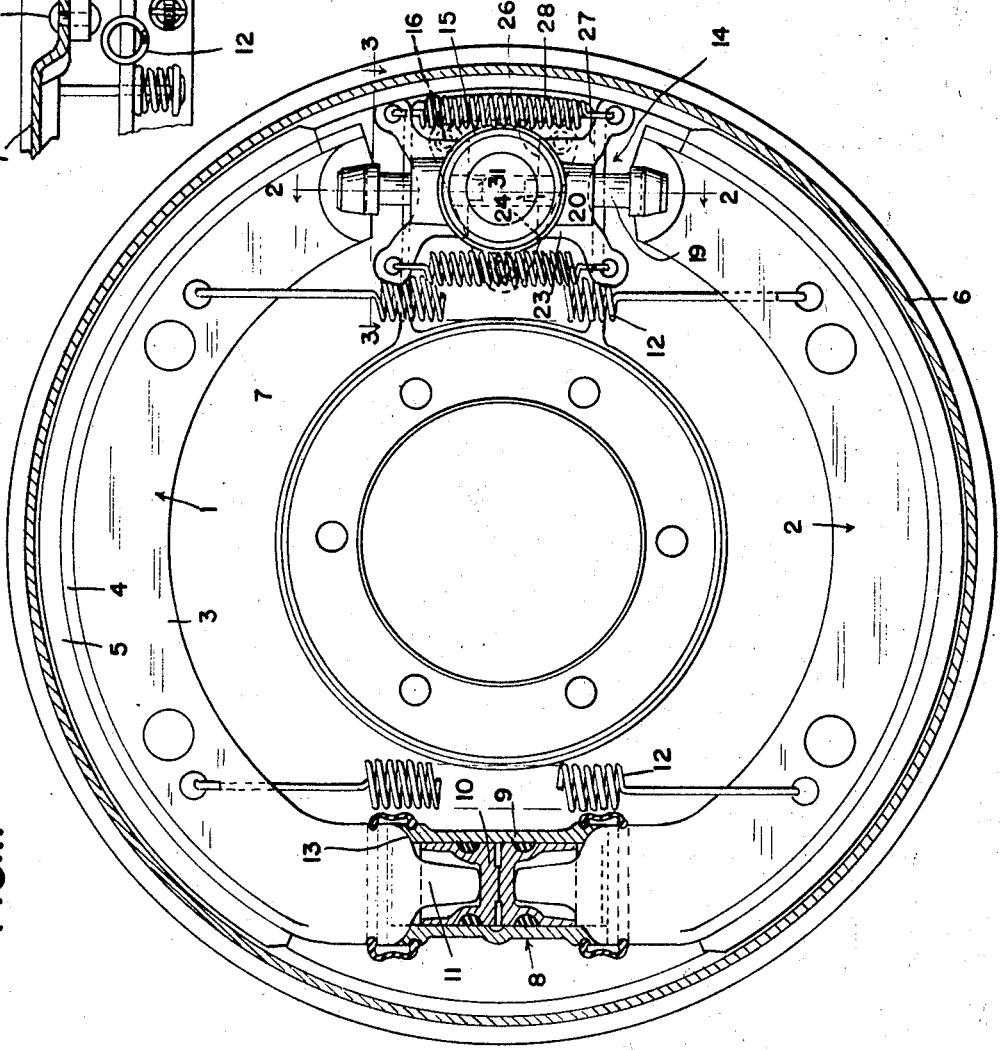
INVENTOR.
CHARLES W. SINCLAIR
BY Whittemore Hulbert & Belknap
ATTORNEYS Patented Sept. 16, 1941

2,255,989

UNITED STATES PATENT OFFICE 2,255,989

BRAKE

Charles W. Sinclair, Detroit, Mich., assignor to Kelsey-Hayes Wheel Company, Detroit, Mich., a corporation of Delaware Application October 9, 1939, Serial No. 298,668

7 Claims. (Cl. 188—78)

The invention relates to brakes and refers more particularly to adjustment devices for the brake friction means. The invention has for an object to provide an improved device for the brake friction means which, in addition to moving the adjacent ends of the brake friction means outwardly relative to the brake drum, also centers the brake friction means in retracted position.

The invention has for another object to so construct and arrange the device that the centering spring means is not overstressed during operation.

These and other objects of the invention will become apparent from the following description taken in connection with the accompanying drawing, in which Figure 1 is a sectional elevation illustrating a brake embodying my invention;

Figures 2 and 3 are cross sections on the lines 2—2 and 3—3, respectively, of Figure 1.

As illustrated in the present instance, the brake friction means is formed of the brake shoes 1 and 2 having separated ends. Each brake shoe is preferably of T-section and has the radially extending web 3 and the axially extending flange 4, the latter having secured to its outer face the brake lining 5. The brake linings are engageable with the brake flange 6 of the brake drum, which may be of usual construction and is formed to be secured in usual manner to a motor vehicle wheel. 7 is the backing plate which may be secured to either the rear axle housing or the steering spindle. 8 is an actuator for spreading adjacent ends of the brake shoes apart and into frictional engagement with the brake flange to apply the brake. The actuator, as shown, is a wheel cylinder which comprises the cylinder 9 secured to the backing plate and the pistons 10 within the cylinder having the outer sides of their heads abutting the reduced extensions 11 formed upon the adjacent ends of the shoe webs. The brake shoes are adapted to be retracted by means of the retracting springs 12 and in the retracted position of the brake shoes the ends of the cylinder 9 engage the shoulders 13 formed upon the adjacent ends of the webs to limit the movement of the ends toward each other. The brake shoes are circumferentially movable in both directions of rotation of the brake drum and the circumferential movement is limited by engagement of a shoulder on one of the webs with the associated end of the cylinder.

For the purpose of adjusting the brake shoes to maintain the desired clearance between their linings and the brake flange, the adjustment device 14 is provided between the ends of the shoe webs 3 opposite the actuator. This adjustment device has the bracket 15 which extends transversely of and is fixedly secured to the backing plate 7 by suitable means such as the rivets 16. 17 is a wedge housed within the bracket and having a maximum diameter which is less than the diameter of the bore 18 of the bracket. 19 are generally circumferentially extending diametrically opposite axially aligned adjustment links extending transversely of and guided by the bracket and having inner ends engaging the inclined bottoms of the diametrically opposite grooves 20 in the wedge and outer ends engaging the shoes. The inner ends of the links are beveled preferably at the same angle as the inclined bottoms of the grooves. The outer ends of the links are bifurcated to embrace the adjacent ends of the webs of the shoes. 21 is a screw extending within the bore of the bracket and threadedly engaging the bracket and adapted upon rotation to axially adjust the wedge 17 to thereby through the adjustment links 19 move the brake shoes relative to the brake flange to secure the desired clearance between the linings and the brake flange. The screw is provided with the polygonally shaped end 22 which is outside the backing plate and is adapted to be engaged by a suitable tool for adjusting the screw.

For the purpose of centering the brake friction means when in retracted position, means is provided for centering the wedge 17 in the bore of the bracket 15. The centering means comprises the bars 23 which extend through the slots 24 in the bracket and engage opposite sides of the wedge. The slots 24 are formed in the opposite portions of the wall of the bracket preferably inwardly beyond the adjustment links. Each bar slidably engages the side surfaces of the slots and has the base portion 25 of sufficient length to rest normally upon the bottom lands 26 of the slots. Each bar also has the diverging arms 27 which extend away from the other bar to provide for an increased length of coil spring 28, which extends between corresponding arms of the bars at the same side of the bracket 15. There are two coil springs, one being radially inwardly and the other radially outwardly of the bracket and these coil springs, in addition to urging the bars 23 to remain seated on the lands 26, serve to center the bars radially of the brake drum by reason of their midpoints contacting the bracket. The wedge 17 has the extended portion 29 which is formed with the opposite flatted portions 30 equidistant from the axis or center of the wedge and spanning the grooves 20. The distance between the flatted portions is such that the extended portion fits between the base portions of the bars thereby centering the wedge circumferentially of the brake drum. For positively positioning the bars radially of the brake drum, their base portions 25 are provided at the middles with the projections 31 which extend into the grooves 20 of the wedge which is positioned radially of the brake drum by means of the adjustment links engaging in the grooves.

In operation, assuming the brake shoes to be in retracted position, application of the brake causes both brake shoes to move circumferentially in the direction of rotation of the brake drum, the primary shoe moving the secondary shoe through the wedge and the associated adjustment links. During this movement the bar at the far side of the bracket, or associated with the secondary brake shoe, is moved circumferentially by the wedge, thereby increasing the tension of the auxiliary coil springs between this bar and the other bar which remains stationary. When the brake is released and the brake shoes are retracted through their retracting springs, the bar which has moved circumferentially is returned to its normal position, as determined by the bracket, by means of the auxiliary coil springs. This bar returns the wedge to its normal or centered position, which in turn centers the brake shoes. The elongation of the auxiliary coil springs varies with the circumferential movement of the brake shoes and wedge so that overstressing of the springs is avoided.

What I claim as my invention is:

1. In a brake, a brake drum rotatable in opposite directions, brake friction means engageable with said drum and movable circumferentially in both directions of rotation of said drum and having spaced ends, a stationary bracket, a member supported on said bracket for movement in directions substantially parallel to the axis of the brake drum and effective upon movement in one direction relative to the bracket to move the ends of said friction means outwardly relative to said drum, said member in the retracted position of said friction means being circumferentially movable in both directions, and means for normally centering said friction means in retracted position comprising members extending transversely of the bracket through opposite sides thereof and engaging opposite sides of said first mentioned member, each of said last mentioned members being circumferentially movable with said first mentioned member in a direction away from the other of said last mentioned members, spring means urging said last mentioned members toward each other, and means on said bracket member limiting movement of said last mentioned members toward each other.

2. In a brake, a brake drum rotatable in opposite directions, brake friction means engageable with said drum and movable circumferentially in both directions of rotation of said drum and having spaced ends, a stationary bracket, a wedge supported on said bracket for moving the ends of said friction means outwardly relative to said drum, said wedge in the retracted position of said friction means being circumferentially movable in both directions relative to said bracket member, and means for normally centering said friction means in retracted position comprising bars engaging opposite sides of said wedge, each of said bars being circumferentially movable with said wedge in a direction away from the other of said bars, spring means between said bars urging said bars toward each other, and means on said bracket limiting movement of said bars toward each other.

3. In a brake, a brake drum rotatable in opposite directions, brake friction means engageable with said drum and movable circumferentially in both directions of rotation of said drum and having spaced ends, a stationary bracket, a member supported on said bracket for movement in directions substantially parallel to the axis of the brake drum and positioned between the ends of said friction means for moving the latter outwardly relative to said drum, said member in the retracted position of said friction means being circumferentially movable in both directions, and means for normally centering said friction means in retracted position comprising members engaging opposite sides of said first mentioned member, each of said last mentioned members being circumferentially movable with said first mentioned member in a direction away from the other of said last mentioned members, spring means urging said last mentioned members toward each other, and means on said bracket guiding said last mentioned members during their movement and limiting movement thereof toward each other.

4. In a brake, a brake drum rotatable in opposite directions, brake friction means engageable with said drum and movable circumferentially in both directions of rotation of said drum and having spaced ends, a stationary bracket, a wedge supported on said bracket for moving the ends of said friction member outwardly relative to said drum, said wedge in the retracted position of said friction means being circumferentially movable in both directions relative to said bracket, and means for normally centering said friction means in retracted position comprising bars engaging opposite sides of said wedge, each of said bars having a base abutting said wedge and slidably engaging said bracket and also having arms extending away from the other of said bars, each of said bars being circumferentially movable with said wedge in a direction away from the other of said bars, spring means at opposite sides of said bracket and extending between and connected to corresponding arms of said bars and urging said bars toward each other, and means on said bracket engageable with the bases of said bars for limiting movement of said bars toward each other.

5. In a brake, a brake drum rotatable in opposite directions, brake friction means engageable with said drum and movable circumferentially in both directions of rotation of said drum and having spaced ends, a stationary bracket, a member supported on said bracket for moving the ends of said friction means outwardly relative to said drum, said member in the retracted position of said friction means being circumferentially movable in both directions, and means for normally centering said friction means in retracted position, comprising members engaging opposite sides of said first mentioned member, each of said last mentioned members being circumferentially movable with said first mentioned member in a direction away from the other of said last mentioned members, spring means urging said last mentioned members toward each other, means on said bracket limiting movement of said last mentioned members toward each other, and cooperating means on said first mentioned member and last mentioned members for radially positioning the latter relative to the former.

6. In a brake, a brake drum rotatable in opposite directions, brake friction means engageable with said drum and movable circumferentially in both directions of rotation of said drum and having spaced ends, a stationary bracket, a member supported on said bracket for moving the ends of said friction means outwardly relative to said drum, said member in the retracted position of said friction means being circumferentially movable in both directions, and means for normally centering said friction means in retracted position comprising members engaging opposite sides of said first mentioned member, said members extending through slots in said bracket and normally engaging the bottom lands of the slots, each of said last mentioned members being circumferentially movable with said first mentioned member in a direction away from the other of said last mentioned members, spring means urging said last mentioned members toward each other, and cooperating means on said first mentioned member and last mentioned members for radially positioning the latter relative to the former.

7. In a brake, a brake drum rotatable in opposite directions, brake friction means engageable with said drum and movable circumferentially in both directions of rotation of said drum and having spaced ends, a stationary bracket having slots in the opposite side walls thereof, a member supported on the bracket for moving the ends of the friction means outwardly relative to said drum, said member being circumferentially movable in both directions in the retracted position of the friction means, means for normally centering the friction means in retracted position comprising members engaging opposite sides of the first named member, said members extending through the slots in said bracket and normally engaging the bottom lands of the slots, each of said last named members being circumferentially movable with the first mentioned member in a direction away from the other of said last mentioned members, and spring means urging said last mentioned members toward each other into engagement with the lands of said slots.

CHARLES W. SINCLAIR.